(12) United States Patent
Fernando et al.

(10) Patent No.: US 6,269,440 B1
(45) Date of Patent: Jul. 31, 2001

(54) ACCELERATING VECTOR PROCESSING USING PLURAL SEQUENCERS TO PROCESS MULTIPLE LOOP ITERATIONS SIMULTANEOUSLY

(75) Inventors: John S. Fernando, Coopersburg; Frank T. Lemmon, Allentown; Shaun P. Whalen, Wescosville, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/244,863

(22) Filed: Feb. 5, 1999

(51) Int. Cl.[7] .................................................. G06F 9/40
(52) U.S. Cl. .................... 712/241; 712/245; 712/246; 709/106; 717/6
(58) Field of Search ................... 709/106; 712/245, 712/246, 241; 717/6

(56) References Cited

U.S. PATENT DOCUMENTS

| | | | |
|---|---|---|---|
| 5,317,743 | * 5/1994 | Imai et al. .......................... 717/6 |
| 5,481,723 | * 1/1996 | Harris et al. ....................... 717/6 |
| 5,537,606 | 7/1996 | Byrne ................................. 395/800 |
| 5,586,320 | * 12/1996 | Hotta et al. ........................ 709/106 |
| 5,758,176 | 5/1998 | Agarwal et al. ................... 395/800 |
| 5,805,875 | 9/1998 | Asanovic ........................... 395/563 |
| 5,832,290 | 11/1998 | Gostin et al. .................. 395/800.05 |
| 5,872,989 | * 2/1999 | Tsushima et al. ................. 712/23 |

* cited by examiner

Primary Examiner—Kenneth S. Kim
(74) Attorney, Agent, or Firm—Dickstein Shapiro Morin & Oshinsky, LLP (57) ABSTRACT

An apparatus and method that speeds the processing of data vectors in a digital processor is disclosed. In accordance with the present invention, a vector zero overhead loop with parallel issue processes multiple data elements at the same time, and yet is programmed with readable assembly language and requires neither vector registers nor a lot of extra registers to implement.

46 Claims, 4 Drawing Sheets

| INSTRUCTION | lpc | mipn | LAST INSTRUCTION IN MULTIPLE ISSUE PACKET? |
|---|---|---|---|
| vdo $4( | | | |
| ld.post.p r0,r1,$4 | 0 | 0 | NO |
| ld.post r2,r3,$4 | 1 | 0 | YES |
| mul r6,r0,r2 | 2 | 1 | YES |
| st.post r6,r5,$4 ) | 3 | 2 | YES |

FIG. 4B

| | | | | | | | | | | | | | | | |
|---|---|---|---|---|---|---|---|---|---|---|---|---|---|---|---|
| num_instr | | x | 4 | 4 | 4 | | | | | | | | 4 | 4 | |
| num_iters | | x | 4 | 4 | 4 | | | | | | | | 4 | 4 | |
| iter_cnt | | x | 0 | | 1 | 2 | | | | | | | 3 | 4 | |
| SEQ0 | state | S1 | S2 | S3 | S4 | S5 | S6 | S5 | S6 | S5 | S6 | S3 | S4 | S5 | S6 |
| | lpc | x | x | 0 | 0 | 0 | 2 | 2 | 3 | 3 | 4 | 0 | 0 | 0 | 2 |
| | mipn | x | x | 0 | 0 | 0 | 1 | 1 | 2 | 2 | 3 | 0 | 0 | 0 | 1 |
| | seq_iter_cnt | x | x | x | 0 | 0 | 0 | 0 | 0 | 0 | 0 | 0 | 2 | 2 | 2 |
| SEQ1 | state | S1 | S2 | S3 | S3 | S4 | S5 | S6 | S5 | S6 | S5 | S6 | S3 | S4 | S5 |
| | lpc | x | x | 0 | 0 | 0 | 0 | 2 | 2 | 3 | 3 | 4 | 0 | 0 | 0 |
| | mipn | x | x | 0 | 0 | 0 | 0 | 1 | 1 | 2 | 2 | 3 | 0 | 0 | 0 |
| | seq_iter_cnt | x | x | x | x | 1 | 1 | 1 | 1 | 1 | 1 | 1 | 1 | 3 | 3 |
| num_instr | | | | | | | | | | | | | | | | |
| num_iters | | | | | | | | | | | | | | | | |
| iter_cnt | | | | | | | | | | | | | | | | |
| SEQ0 | state | S5 | S6 | S5 | S6 | S3 | S1 | | | | | | | | |
| | lpc | 2 | 3 | 3 | 4 | 0 | 0 | | | | | | | | |
| | mipn | 1 | 2 | 2 | 3 | 0 | 0 | | | | | | | | |
| | seq_iter_cnt | 2 | 2 | 2 | 2 | 2 | 2 | | | | | | | | |
| SEQ1 | state | S6 | S5 | S6 | S5 | S6 | S3 | S1 | | | | | | | |
| | lpc | 2 | 2 | 3 | 3 | 4 | 0 | 0 | | | | | | | |
| | mipn | 1 | 1 | 2 | 2 | 3 | 0 | 0 | | | | | | | |
| | seq_iter_cnt | 3 | 3 | 3 | 3 | 3 | 3 | 3 | | | | | | | |

ACCELERATING VECTOR PROCESSING USING PLURAL SEQUENCERS TO PROCESS MULTIPLE LOOP ITERATIONS SIMULTANEOUSLY

BACKGROUND OF THE INVENTION

1. Field of the Invention

The present invention relates generally to data processing, and more particularly to a method and apparatus for increasing the speed of processing data vectors in a digital signal processor or microprocessor without requiring vector registers or a large number of registers.

2. Description of the Related Art

A data vector is a series of data elements. The concept of vector processing has been incorporated into computing systems to provide high computational throughput for many applications by performing the same series of operations on each data element or pairs of data elements.

Typically, the vector processing loops required to perform the same series of operations on each data element or pairs of data elements dominate the amount of time required to process signal processing kernels. The time required to perform these vector processing loops has been decreased in a number of ways utilizing both hardware and software. For example, software techniques include unrolling the loops, using parallel issue including reordering the instructions, and software pipelining. In hardware, zero overhead looping, parallel execution (both superscalar and instruction indicated), post-address-modifying loads and stores, vector units and vector registers, and Very Long Instruction Word (VLIW) instructions that do several of the required operations in parallel have been implemented. Although these methods increase the speed of the vector processing, they either require extra code, make the required assembly code hard to read and understand, or require extra registers that are not used except for these vector operations.

One approach to exploiting the kind of parallelism inherent in vector processing is through the use of dynamic scheduling. Several dynamic scheduling techniques are known in the art, including superscalar, scoreboarding, and reservation stations. Reservation stations, in particular, address the problem of executing multiple iterations of a loop without changing the source code. Reservation stations work by eliminating false dependencies between the instructions of different loop iterations. When the instructions of a particular iteration are executed by a sequential issue machine, dependencies between the instructions within the iteration may block issuing of instructions in the next iteration, even though there are sufficient hardware resources and no dependencies between the current iteration and the next. Reservation stations allow an instruction to be issued and buffered at a functional unit for later execution. This frees the issue pipeline to process additional instructions and begin the next iteration before the current one is finished. Reservations stations, however, require additional hardware, are extremely complex, and make the execution time of the loop non-deterministic.

Thus, there exists a need for an apparatus and method that increases the speed of processing of data vectors by processing multiple data elements at the same time which is programmed with readable assembly language and does not require a lot of extra registers.

SUMMARY OF THE INVENTION

The present invention overcomes the problems associated with the prior art and provides an apparatus and method that speeds the processing of data vectors using a zero overhead loop with parallel issue and post-address-modifying loads and stores that processes multiple data elements at the same time, and yet is programmed with readable assembly language and does not require a lot of extra registers.

In accordance with the present invention, the loop instructions are formed as producer-consumer instructions, i.e., the result of instruction M is used only by instruction M or M+1, and the results are stored into different registers. A compiler or assembler detects the producer-consumer loops, reassigns registers to meet the different result criteria, and encodes the zero overhead loop as a vector zero overhead (vdo) loop. Since the loop analysis is done in software, there is no additional hardware required to detect it. Also, since general purpose registers are used, there is no need for vector registers. Furthermore, since only register assignments and the zero overhead loop instruction are changed to a vector zero overhead loop instruction, the readability of the assembly code is maintained.

These and other advantages and features of the invention will become apparent from the following detailed description of the invention which is provided with the accompanying drawings.

DETAILED DESCRIPTION OF THE PREFERRED EMBODIMENTS

The present invention will be described as set forth in the preferred embodiment illustrated in FIGS. 1–4. Other embodiments may be utilized and structural, logical or programming changes may be made without departing from the spirit or scope of the present invention.

In accordance with the present invention, the speed of processing data vectors is increased utilizing a vector zero overhead loop in place of a zero overhead loop. For the purposes of this discussion, an instruction is defined as a packet of one or more instructions that can be issued in parallel, which may also be referred to as a multi-issue packet.

The invention operates by starting loop iteration N+1 (N+2, etc.) before iteration N is finished. For example, below is a representative loop in a pseudo code assembly language that multiplies a vector and a scalar and puts the result into a second vector utilizing a conventional zero overhead loop, i.e., a do instruction:

```
do $4                  ! do instructions between {and} 4 times
{
ld.post r2, r3, $4     ! load element pointed to by r3 into r2
                       ! add 4 to r3 (post increment)
mul r2, r0, r2         ! multiply r0 tiines r2
                       ! put result in r2
st.post r2, r5, $4     ! store r2 to memory pointed to by r5
                       ! add 4 to r5
}
```

The conventional zero overhead loop above specifies four iterations, with three cycles in each iteration. Before iteration N+1 can begin, iteration N must be complete. For example, before the second iteration can begin, the first iteration must be complete, before the third iteration can begin, the second iteration must be complete, and so forth. This means that a total of twelve cycles (three per iteration) is required to complete the loop. In accordance with the present invention, the processing speed of the loop is increased by starting loop iteration N+1 (N+2, etc.) before iteration N (N+1, etc.) is finished utilizing a vector zero overhead loop. For a loop to be processed in this manner, its instructions must be producer-consumer instructions, i.e., the result of instruction M must be used only by instruction M or M+1. In addition, the results must be stored in different registers.

Thus, the zero overhead loop above may be changed to a vector zero overhead loop, i.e., a vdo instruction, as follows:

```
vdo $4                 ! do instructions between {and} 4 times
                       ! can start the next iteration before the
                       ! current iteration completes.
{
ld.post r2, r3, $4     ! load element pointed to by r3 into r2
                       ! add 4 to r3
mul r6, r0, r2         ! multiply r0 times r2
                       ! put result in r6
st.post r6, r5, $4     ! store r6 to memory pointed to by r5
                       ! add 4 to r5
}
```

In the vector zero overhead loop above the do instruction was changed to a vdo instruction and the result of the multiply was placed into register r6 instead of register r2 since r2 was used to store the result of the first load.

Figure 1:
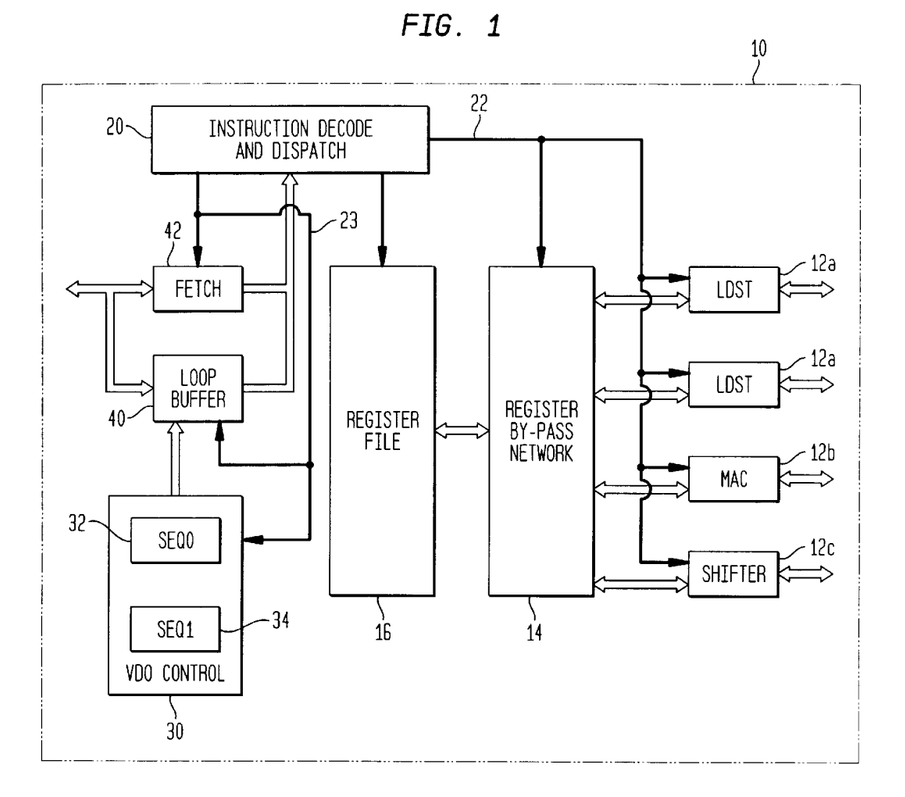
FIG. 1 illustrates an apparatus which enables the vector processing in accordance with the present invention.

In accordance with the present invention, the apparatus must insure that each result register is read by its consumer before the next iteration overwrites it. FIG. 1 illustrates in block diagram form the major data paths and control logic for a processor 10 which is capable of performing multiple iterations at once and ensuring that the result registers are not overwritten before they are read in accordance with the present invention. Processor 10 includes several functional units as are known in the art, such as, for example, a load/store (LDST) functional unit 12a, a Multiply/Accumulate (MAC) functional unit 12b, and a Shifter functional unit 12c. A register by-pass network 14, as is known in the art, enables the result from a functional unit 12 to be used as an operand by the same or a different functional unit 12 in a succeeding cycle. Thus, by utilizing the register by-pass network 14, instruction M of iteration N+1 can issue in parallel with instruction M+1 of iteration N since reads are done at the beginning of the instruction execute cycle and writes are done at the end of the cycle, possibly in a different pipe stage. A register file 16 is provided to store results from a functional unit 12. An instruction decode and dispatch unit 20 is provided to perform instruction selection and routing functions, and is connected to each functional unit 12 and the register bypass network 14 via line 22 to route instructions under either normal operation or operation in accordance with the present invention.

In accordance with the present invention, a Vdo control unit 30, which comprises a first instruction sequencer SEQ0 32 and a second instruction sequencer SEQ1 34, a loop buffer 40, a fetch unit 42 for sending addresses to and getting instructions back from a memory (not shown), an iteration counter 60, a number of iterations (nutm_iter) register 61 and a number of instructions (num_instr) register 62 are provided. Although only two instruction sequencers 32, 34 are shown, the invention is not so limited, and any number of instruction sequencers greater than two may be used. Iteration counter 60 stores the number of iterations that have been processed in whole or in part by instruction sequencers 32, 34. The number of iterations (num_iter) register 61 is adapted to store a value representing a total number of iterations of said program loop performed by instruction sequencers 32, 34. The number of instructions (num_instr) register 62 is adapted to store a value representing a total number of instructions of said program loop performed by instruction sequencers 32, 34.

Fetch unit 42, loop buffer 40 and Vdo control unit 30 are connected to instruction decode and dispatch unit 20 via line 23. State machines (not shown), as are known in the art, in each sequencer 32, 34 implement functional unit allocation, control of loop initialization, and the start of each iteration in accordance with the present invention. Functional unit allocation is used to give priority to preceding iterations over succeeding iterations, for example to iteration N, then N+1, N+2, etc. The sequencers 32, 34 are used to execute the instructions in the loop.

The implementation of the vdo capability in accordance with the present invention relics on the loop buffer 40 having multiple read ports and an instruction issue data path that can be fed either from a normal memory fetch path or from the loop buffer 40 under control of either the vdo control 30 or the instruction decode and dispatch unit 20. The overall structure of the instruction path of the processor 10 of FIG. 1 is illustrated generally in FIG. 2.

When the instruction decode and dispatch unit 20 detects a vdo opcode, sequencers SEQ0 32 and SEQ 1 34 are initialized and iteration counter 60 is set to zero. The number of iterations (num_iter) register 61 is set to the vdo argument, i.e., the number of iterations to be performed in the loop. As the vdo code is fetched, it is written to the loop buffer 40 via line 64. The SEQ0 32 sequencer executes the first iteration of the loop by setting its loop program counter (LPC) 66 to the top of the loop and fetching the instruction. After SEQ0 32 issues its first instruction, which may possibly be a multi-issue packet of instructions, SE0 32 sets LPC 66 to the next instruction of the loop and repeats the process. After SEQ0 32 has issued its first instructions, SEQ1 34 is enabled to begin fetching from the loop buffer 40 (top of the loop). As SEQ1 fetches from the loop buffer 40, it sets its LPC 68 to the next instruction and repeats the fetch/issue process.

Figure 2:
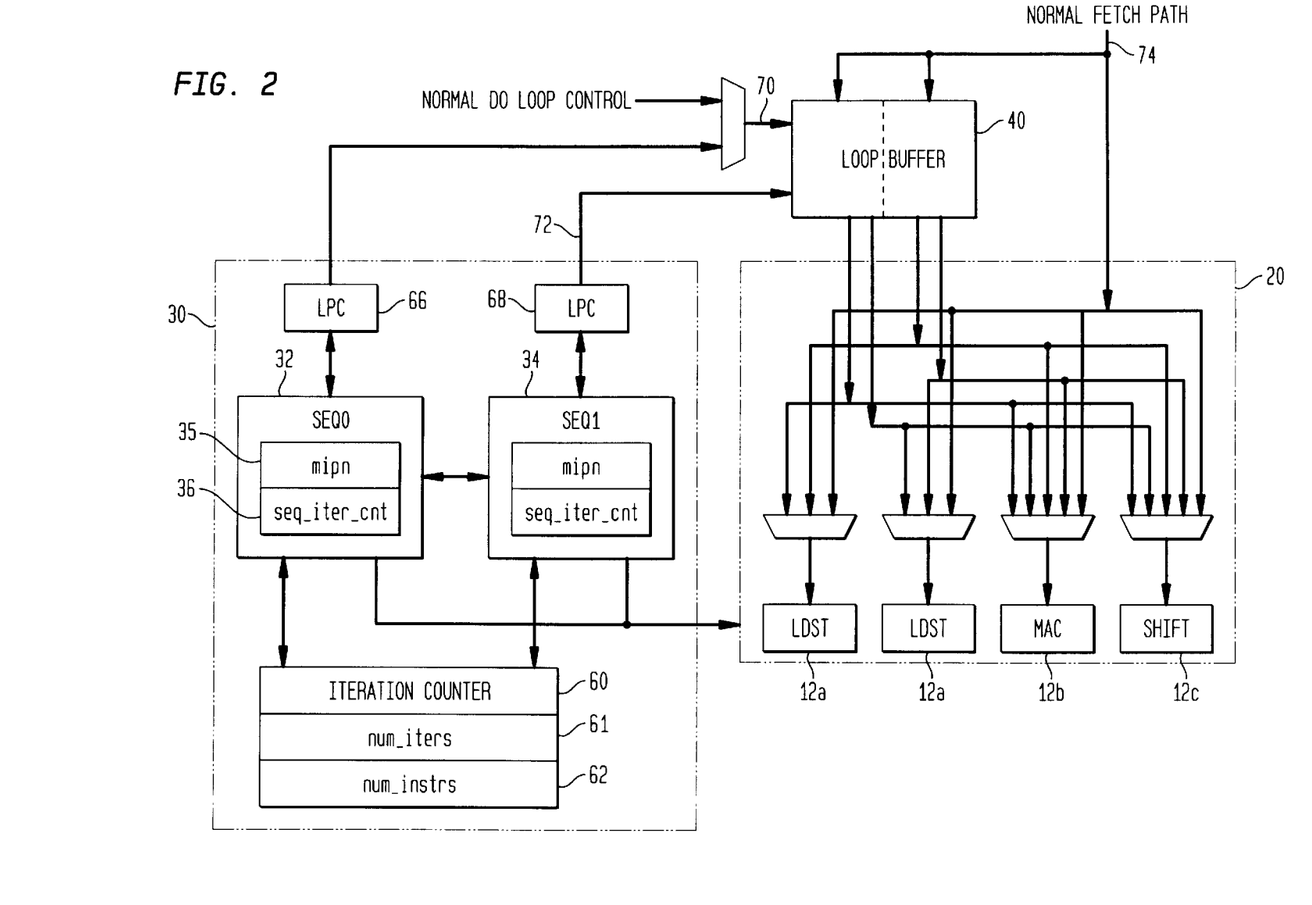
FIG. 2 illustrates in block diagram form a path for the instructions that implements the vdo processing in accordance with the present invention.

The loop buffer 40 has two read port address lines 70, 72. Read port address line 70 is used for sequencer SEQ0 32 and also control of a normal do loop, while read port address line 72 is used for sequencer SEQ1 34. Each read port address line 70, 72 may be multiple instructions wide, depending upon the degree of multiple issue supported. The dual issue case of FIG. 2 is shown for illustrative purposes only, and the invention need not be so limited. The loop buffer 40 is written from the instruction stream fetched by the normal fetch path 74 via line 64.

Each sequencer 32, 34 includes a multiple issue packet number (mipn) register 35 and a sequence iteration Count (seq_iter_cnt) register 36. A multiple issue packet number, hereinafter which may also be referred to simply as a packet number, is a unique number that is assigned to each instruction in a given multi-issue packet as it is stored into the loop buffer 40. Each sequencer 32, 34 begins its fetch/issue process by checking, when enabled by all sequencers processing preceding iterations, if the iteration counter 60 indicates any unexecuted iterations. Thus for example, if sequencer 32 initiates execution of the loop, sequencer 32 will copy the current value of the iteration counter 60 to its sequence iteration count (seq_iter_cnt) register 36 and then set iteration counter 60 to the next iteration. Thus, iteration counter 60 will count the number of iterations performed by both sequencers 32, 34. Sequencer 32 will use the sequence iteration count (seq_iter_cnt) register 36 value for resolution of functional unit usage conflicts with the other sequencers, such as sequencer 34. When the sequencers 32, 34 complete the instructions in the loop, the iteration counter 60 is checked and the sequencers 32, 34 will continue processing if any iterations remain.

Referring back to the previous example of the conventional zero overhead loop, the code can be issued as follows:

ld.post r2, r3, $4
mul r2, r0, r2
st.post r2, r5, $4
ld.post r2, r3, $4
mul r2, r0, r2
st.post r2, r5, $4
ld.post r2, ri3, $4
mul r2, r0, r2
st.post r2, r5, $4
ld.post r2, r3, $4
mul r2, r0, r2
st.post r2, r5, $4

The instructions in the above loop will take twelve cycles, one for each line of code, to execute utilizing a prior art zero overhead loop. In accordance with the present invention, utilizing two sequencers such as sequencers 32, 34 of FIGS. 1 and 2, the instructions require only seven cycles to execute, cutting the execution time from twelve cycles down to seven cycles. Utilizing a two sequencer vector zero overhead loop the instructions will be issued as follows:

| SEQUENCER 1 | SEQUENCER 2 |
| --- | --- |
| ld.post r2, r3, $4 | |
| mul r6, r0, r2 | |
| st.post r6, r5, $4 | ld.post r2, r3, $4 |
| ld.post r2, r3, $4 | mul r6, r0, r2 |
| mul r6, r0, r2 | st.post r6, r5, $4 |
| st.post r6, r5, $4 | ld.post r2, r3, $4 |
| | mul r6, r0, r2 |
| | st.post r6, r5, $4 |

Figure 3:
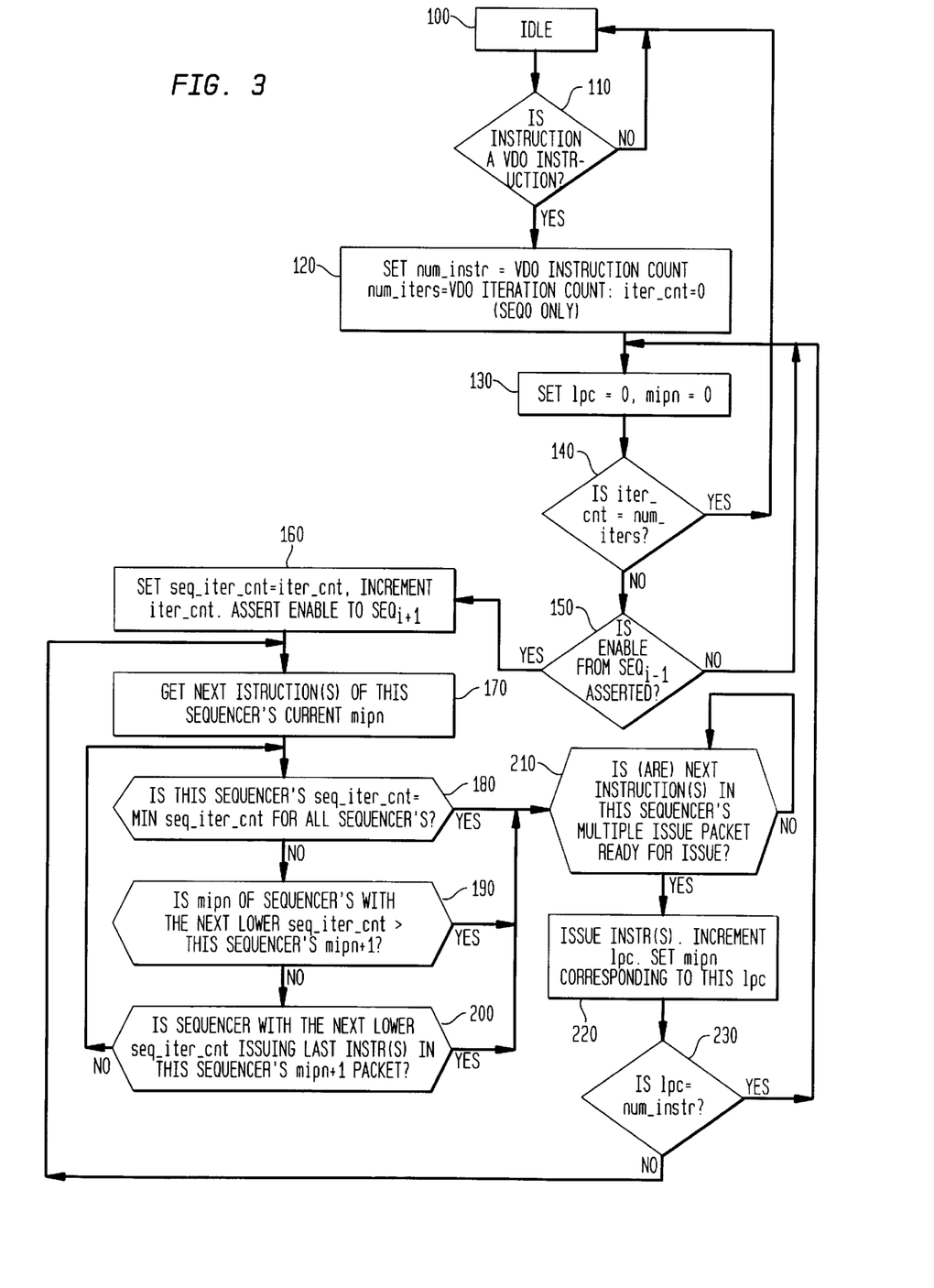
FIG. 3 illustrates in flow chart form the steps of a vdo sequencer in accordance with the present invention.

FIG. 3 illustrates in flow chart form the method for issuing instructions followed by each sequencer 32, 34 of the vdo control 30 in accordance with the present invention. In step 100, each sequencer 32, 34 is idle. In step 110, it is determined if an instruction to be executed is a vdo instruction. Instructions may issue one at a time or in a group as a multiple issue packet. If the instruction is not a vdo instruction, the vdo sequencers 32, 34 remain idle. If the instruction is a vdo instruction, one of the sequencers, such as for example sequencer 32, will initialize several registers on behalf of all the instruction sequencers in step 120. In step 120, the value of a number of instructions register 62 (num_instr) is set to the vdo instruction count. Additionally, the value of a number of iterations register 61 (num_iter) is set to the vdo iteration count, and an iteration counter (iter_cnt) 60 is set to zero. Only sequencer 32 (SEQ0) performs the operations specified in step 120. In step 130, loop program counter (lpc) 66 is set to zero, and a multiple issue packet number (mipn) register 35 is set to zero.

In step 140, it is determined if the value of the iteration counter (iter_cnt) 60 is equal to the value in the number of iterations (num_iter) register 61. If the value of the iteration counter (iter_cnt) 60 equals the value of the number of iterations (num_iter) register 61, all instructions in the loop have been executed and the sequencers 32, 34 return to an idle state in step 100. If the value of the iteration counter (iter_cnt) 60 is not equal to the value of the number of iterations (num_iter) register 61, i.e., there are still instructions left to execute, it is next determined if an enable from a previous sequencer $SQ_{i-1}$ has been asserted in step 150. The enable for SEQ0 32 is always asserted, as SEQ0 32 executes the first instruction. SEQ1 34 will determine if SEQ0 32 has enabled SEQ1 34 to fetch and execute an instruction. If the enable has not been asserted, the loop program counter (lpc) 66 is set to zero, and the multiple issue packet number (mipn) register 35 is set to zero again in step 30. If the enable has been asserted, sequence iteration count (seq_iter_cnt) register 36 is set to the value of the iteration counter (iter_cnt) 60 and the iteration counter (iter_cnt) 60 is incremented in step 160. Additionally, in step 160, the enable to the succeeding sequencer, $SEQ_{i+1}$, is enabled.

In step 170, each respective sequencer retrieves the next instruction of the current multiple issue packet number (mipn) for that sequencer. In step 180, it is determined if the value in the sequence iteration count (seq_iter_cnt) register 36 for that sequencer is equal to the minimum value of the sequencer iteration count (seq_iter_cnt) register 36 for all sequencers 32, 34. If the sequence iteration count of that sequencer is equal to the minimum value of the sequence iteration count (seq_iter_cnit) for all sequencers 32, 34, in step 210 it is determined if the next instruction or instructions of the multiple issue packet for that sequencer are ready for issue. If they are not ready for issue, that sequencer will wait until they are ready for issue. Once the next instruction is ready for issue (a YES response in step 210), the instructions will be issued, the loop program counter (lpc) will be incremented, and the multiple issue packet number (mipn) register 35 will be set to a value indicating the number of the multi-issue packet corresponding to the number of the instruction indicated by the loop program counter (lpc) for that instruction sequencer in step 220. In step 230, it is determined if the loop program counter (lpc) is equal to the value in the number of instructions (num_instr) register 62. If they are equal, the method will return to step 130 and continue processing. If the loop program counter (lpc) is not equal to the value in the number of instructions (num_instr) register 62, the method will return to step 170 and continue processing.

If the sequence iteration count (seq_iter_cnt) for that sequencer is not equal to the minimum value of the sequence iteration count (seq_iter_cnt) for all sequencers (a NO response in step 180), it is determined if the multiple issue packet number (mipn) of the sequencer with the next lower sequence iteration count (seq_iter_cnt) is greater than the multiple issue packet number (mipn) +1, i.e., the number of the next packet, of that sequencer in step 190. If the multiple issue packet number (mipn) of the sequencer with the next lower sequence iteration count (seq_iter_cnt) is greater than the multiple issue packet number (mipn) +1 of that sequencer (a YES response in step 190), it is determined if the next instruction or instructions are ready for issue in step 210 as described above. If the multiple issue packet number (mipn) of the sequencer with the next lower sequence iteration count (seq_iter_cnt) is not greater than the multiple issue packet number (mipn) +1 of that sequencer (a NO response in step 190), it is determined in step 200 if the sequencer with the next lower sequence iteration count (seq_iter_cnt) is issuing the last instruction in that sequencer's multiple issue packet number (mipn) +1 packet. If the sequencer with the next lower sequence iteration count (seq_iter_cnt) is issuing the last instruction in that sequencer's multiple issue packet number (mipn) +1 packet (a YES response in step 200), it is determined if the next instruction or instructions are ready for issue in step 210 as described above. If the sequencer with the next lower sequence iteration count (seq_iter_cnt) is not issuing the last instruction in the that sequencer's multiple issue packet number (mipn) +1 packet (a NO response in step 200), the method returns to step 180 for continued processing.

Thus, in accordance with the present invention, the speed of processing data vectors is increased by forming the loop instructions as producer-consumer instructions and utilizing more than one sequencer to allow for the start of an iteration N+1 of a program loop before iteration N of the program loop is completed.

Figure 4A:
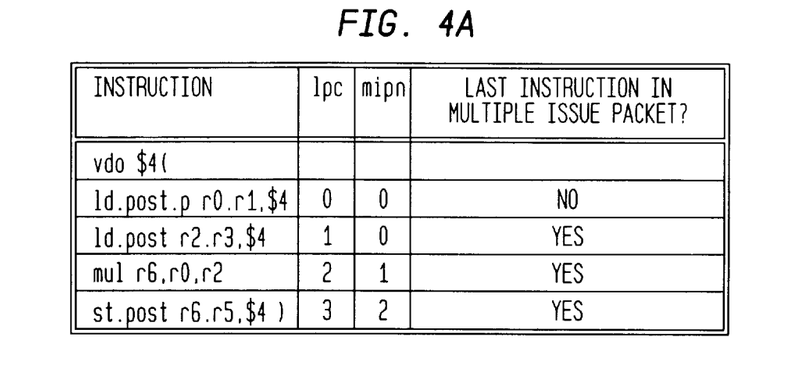
FIG. 4A illustrates an example of a code sequence including a multiple issue packet with the corresponding loop program counter (lpc) value and mipn for each line in accordance with the present invention.

FIG. 4A illustrates an example of a code sequence including a multiple issue packet with the corresponding loop program counter (lpc) value and mipn for each line. The instruction sequence shown in FIG. 4A computes the product of two vectors located in memory at the addresses indicated by the initial values of r1 and r3. The product vector is stored into memory at the address indicated by the initial value of r5. The code includes four instructions, two of which are grouped into a single multiple issue packet.

Figure 4B:
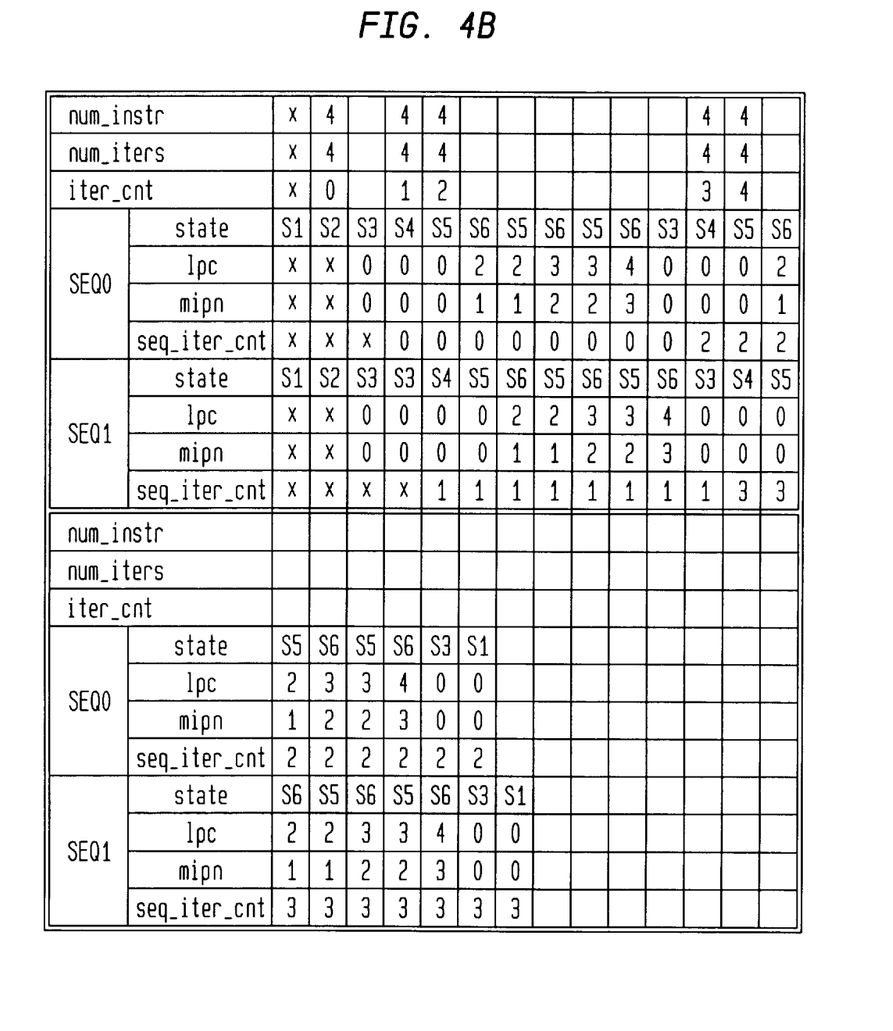
FIG. 4B illustrates in table format the values of the registers in each sequencer during execution of the code from FIG. 4A in accordance with the present invention.

FIG. 4B illustrates in table form the behavior of the sequencers 32, 34 when processing the code shown in FIG. 4A. The table of FIG. 4B illustrates the state sequence and changing register values as each sequencer's 32, 34 state machine processes the example loop. The state transitions shown in the table of FIG. 4B and in the flow chart of FIG. 3 are the logical steps of the method and need not occur on clock cycle boundaries. The upper part of the table shows the first fourteen state transitions. The lower part of the table shows the remaining state transitions. The table cells indicate the value of the register named for the corresponding row in each sequencer. The global register values (num_instr, num_iter, iter_cnt) are only shown when they change. Register values that change are shown with their new values in the state where they are modified. The value x indicates the value prior to any initialization by the state machine. The initialization of the global registers to the values given in the instruction is only performed by sequencer SEQ0 32.

Reference has been made to a preferred embodiment in describing the invention. However, additions, deletions, substitutions, or other modifications which would fall within the scope of the invention defined in the claims may be implemented by those skilled in the art and familiar with the disclosure of the invention without departing from the spirit or scope of the invention. Also, although the invention is preferably implemented in hardware, it may be implemented in hardware, software, or any combination of the two. All are deemed equivalent with respect to the operation of the invention. Accordingly, the invention is not to be considered as limited by the foregoing description, but is only limited by the scope of the appended claims.

What is claimed as new and desired to be protected by Letters Patent of the United States is:

1. A processor for processing vector data, said processor comprising:

a plurality of functional units;

a register by-pass network connected to each of said plurality of functional units, said register by-pass network allowing a result produced by one of said plurality of functional units to be used as an operand by said one of said plurality of functional units or another of said plurality of functional units in an immediate succeeding cycle;

a register file connected to said register by-pass network, said register file adapted to store a result produced by each of said plurality of functional units;

an instruction decode and dispatch unit connected to said register file and each of said plurality of functional units; and a vector zero overhead loop control circuit connected to said instruction decode and dispatch unit to receive instructions from said instruction decode and dispatch unit, said vector zero overhead loop control circuit comprising:

a plurality of instruction sequencers, one of said plurality of instruction sequencers being adapted to start iteration N+1 of a program loop before iteration N of said program loop is completed by another of said plurality of instruction sequencers; and an iteration counter connected to said plurality of instruction sequencers, said iteration counter being adapted to store a value representing a number of iterations that have been processed in whole or in part by said plurality of instruction sequencers.

2. The processor according to claim 1, wherein said plurality of instruction sequencers further comprises:

a first instruction sequencer connected to a loop buffer; and a second instruction sequencer connected to said first instruction sequencer and said loop buffer, wherein said program loop is written to said loop buffer and after said first instruction sequencer executes a first iteration of said program loop and issues a first instruction, said second instruction sequencer is enabled to fetch instructions from said loop buffer.

3. The processor according to claim 1, wherein said plurality of functional units includes a shifter.

4. The processor according to claim 2, wherein said zero vector overhead loop control circuit further comprises:

a first register connected to said first and second instruction sequencers, said first register being adapted to store a value representing a total number of iterations of said program loop performed by said first and second instruction sequencers.

5. The processor according to claim 4, wherein said zero vector overhead loop control circuit further comprises:

a second register connected to said first and second instruction sequencers, said second register being adapted to store a value representing a total number of instructions of said program loop performed by said first and second instruction sequencers.

6. The processor according to claim 5, wherein said zero vector overhead loop control circuit further comprises:
- a first loop program counter connected between said first instruction sequencer and said loop buffer to count a number of instructions of said program loop executed by said first instruction sequencer; and
- a second loop program counter connected between said second instruction sequencer and said loop buffer to count a number of instructions of said program loop executed by said second instruction sequencer.

7. The processor according to claim 6, wherein each of said first and second instruction sequencers farther comprise:
- a third register adapted to store a value representing said number of iterations from said iteration counter.

8. The processor according to claim 7, wherein each of said first and second instruction sequencer further comprises:
- a fourth register adapted to store a value representing a multi-issue packet number corresponding to an instruction indicated by said first and second loop program counter respectively.

9. The processor according to claim 1, wherein said plurality of functional units includes a load/store functional unit.

10. The processor according to claim 1, wherein said plurality of functional units includes a multiply/accumulate functional unit.

11. A processor for processing a data vector, said processor comprising:
- a plurality of instruction sequencers, each of said instruction sequencers being adapted to execute a succeeding loop iteration of a vector zero overhead loop before a preceding loop iteration has completed execution by another of said plurality of instruction sequencers; and
- an iteration counter connected to said plurality of instruction sequencers, said iteration counter being adapted to store a value representing a number of iterations that have been processed in whole or in part by said plurality of instruction sequencers.

12. The processor according to claim 11, further comprising:
- a first register connected to said plurality of instruction sequencers, said first register being adapted to store a value representing a total number of iterations of said vector zero overhead loop performed by said plurality of instruction sequencers.

13. The processor according to claim 12, further comprising:
- a second register connected to said plurality of instruction sequencers, said second register being adapted to store a value representing a total number of instructions of said vector zero overhead loop performed by said plurality of instruction sequencers.

14. The processor according to claim 13, further comprising:
- a plurality of loop program counters, each of said plurality of loop program counters being connected between a respective one of said plurality of instruction sequencers and a loop buffer.

15. The processor according to claim 14, wherein each of said plurality of instruction sequencers further comprise:
- a third register adapted to store a value representing said number of iterations from said iteration counter.

16. The processor according to claim 15, wherein each of said plurality of instruction sequencers further comprises:
- a fourth register adapted to store a value representing a multi-issue packet number corresponding to an instruction indicated by a respective one of said loop program counters.

17. The processor according to claim 11, wherein said processor includes a digital signal processor.

18. The processor according to claim 11, wherein said processor includes a microprocessor.

19. A method for processing a data vector in a processor, said method comprising the steps of:
- receiving instructions to process said data vector as a vector zero overhead loop;
- executing a loop iteration N of said vector zero overhead loop with one of a plurality of instruction sequencers and a loop iteration N+1 of said vector zero overhead loop with another of said plurality of instruction sequencers before said loop iteration N is finished; and
- counting a number of iterations that have been executed by said plurality of instruction sequencers.

20. The method according to claim 19, wherein said receiving step further comprises:
- receiving said instructions to process said data vector that are encoded as producer-consumer instructions.

21. The method according to claim 19, further comprising the steps of:
- setting a number of instructions register equal to an instruction count of said vector zero overhead loop;
- setting a number of iterations register equal to an iteration count specified by said vector zero overhead loop; and
- setting an iteration counter to zero.

22. The method according to claim 21, further comprising the steps of:
- setting a loop program counter to zero; and
- setting a multiple issue packet number register to zero.

23. The method according to claim 22, further comprising the step of:
- determining if a number of iterations indicated by said iteration counter is equal to a value in said number of iterations register.

24. The method according to claim 23, wherein if an instruction sequencer determines said number of iterations indicated by said iteration counter is equal to a value in said number of iterations register, said method further comprises:
- making said instruction sequencer idle until a next vector zero overhead loop is received.

25. The method according to claim 23, wherein if an instruction sequencer determines said number of iterations indicated by said iteration counter is not equal to a value in said number of iterations register, said method further comprises:
- determining if said instruction sequencer has been enabled by a preceding instruction sequencer.

26. The method according to claim 25, wherein if said instruction sequencer has not been enabled, said method further comprises:
- repeating said steps of setting said loop program counter to zero, setting said multiple issue packet number register to zero, and determining if a number of iterations indicated by said iteration counter is equal to a value in said number of iterations register step and said determining if said instruction sequencer has been enabled.

27. The method according to claim 25, wherein if said instruction sequencer has been enabled, said method further comprises:

setting a value of a sequence iteration count register of said instruction sequencer equal to said iteration counter;

incrementing said iteration counter; and enabling a succeeding sequencer.

28. The method according to claim 27, further comprising the steps of:

retrieving a next instruction to be executed by said instruction sequencer; and determining if said value of said sequence iteration count register of said instruction sequencer is equal to a minimum sequence iteration count of said plurality of instruction sequencers.

29. The method according to claim 28, wherein if said value of said sequence iteration count register of said instruction sequencer is equal to a minimum sequence iteration count of said plurality of instruction sequencers, said method further comprises:

determining if said next instruction is ready for issue.

30. The method according to claim 29, wherein if said next instruction is not ready for issue, said method further comprises:

waiting until said next instruction is ready for issue.

31. The method according to claim 29, wherein if said next instruction is ready for issue, said method further comprises:

issuing said next instruction from said instruction sequencer;

incrementing said loop program counter;

setting said multiple issue packet number register to a value indicating a number of a multi-issue packet corresponding to a number of an instruction indicated by said loop program counter; and determining if a value of said loop program counter is equal to a value in said number of instructions register.

32. The method according to claim 31, wherein if said value of said loop program counter is not equal to said value in said number of instructions register, said method further comprises:

repeating said steps of retrieving a next instruction to be executed by said instruction sequencer and determining if said value of said sequence iteration count register of said instruction sequencer is equal to a minimum sequence iteration count of said plurality of instruction sequencers.

33. The method according to claim 31, wherein if said value of said loop program counter is equal to said value in said number of instructions register, said method further comprises:

repeating said steps of setting said loop program counter to zero, setting said multiple issue packet number register number to zero, and determining if a number of iterations indicated by said iteration counter is equal to a value in said number of iterations register.

34. The method according to claim 28, wherein if said sequence iteration count of said instruction sequencer is not equal to a minimum sequence iteration count of said plurality of instruction sequencers, said method further comprises:

determining if a packet number of an instruction sequencer with a next lower iteration count is greater than a next packet number of said instruction sequencer.

35. The method according to claim 34, wherein if said packet number of an instruction sequencer with a next lower iteration count is greater than a next packet number of said instruction sequencer, said method further comprises:

determining if said next instruction is ready for issue.

36. The method according to claim 35, wherein if said next instruction is not ready for issue, said method further comprises:

waiting until said next instruction is ready for issue.

37. The method according to claim 35, wherein if said next instruction is ready for issue, said method further comprises:

issuing said next instruction from said instruction sequencer;

incrementing said loop program counter;

setting said multiple issue packet number register to a value indicating a number of a multi-issue packet corresponding to a number of an instruction indicated by said loop program counter; and determining if a value of said loop program counter is equal to a value in said number of instructions register.

38. The method according to claim 37, wherein if said value of said loop program counter is not equal to said value in said number of instructions register, said method further comprises:

repeating said steps of retrieving a next instruction to be executed by said instruction sequencer, and determining if said value of said sequence iteration count register of said instruction sequencer is equal to a minimum sequence iteration count of said plurality of instruction sequencers.

39. The method according to claim 37, wherein if said value of said loop program counter is equal to said value in said number of instructions register, said method further comprises:

repeating said steps of setting said loop program counter to zero, setting said multiple issue packet number register number to zero, and determining if a number of iterations indicated by said iteration counter is equal to a value in said number of iterations register.

40. The method according to claim 34, wherein if said packet number of an instruction sequencer with a next lower sequence iteration count is not greater than a next packet number of said instruction sequencer, said method further comprises:

determining if said instruction sequencer with a next lower sequence iteration count is issuing a last instruction in said next packet number of said instruction sequencer.

41. The method according to claim 40, wherein if said instruction sequencer with a next lower sequence iteration count is issuing a last instruction in said next packet number of said instruction sequencer, said method further comprises:

determining if said next instruction is ready for issue.

42. The method according to claim 41, wherein if said next instruction is not ready for issue, said method further comprises:

waiting until said next instruction is ready for issue.

43. The method according to claim 41, wherein if said next instruction is ready for issue, said method further comprises:

issuing said next instruction from said instruction sequencer;

incrementing said loop program counter;

setting said multiple issue packet number register to a value indicating a number of a multi-issue packet corresponding to a number of an instruction indicated by said loop program counter; and determining if a value of said loop program counter is equal to a value in said number of instructions register.

44. The method according to claim 43, wherein if said value of said loop program counter is not equal to said value in said number of instructions register, said method further comprises:

repeating said steps of retrieving a next instruction to be executed by said instruction sequencer, and determining if said value of said sequence iteration count register of said instruction sequencer is equal to a minimum sequence iteration count of said plurality of instruction sequencers.

45. The method according to claim 43, wherein if said value of said loop program counter is equal to said value in said number of instructions register, said method further comprises:

repeating said steps of setting said loop program counter to zero, setting said multiple issue packet number register number to zero, and determining if a number of iterations indicated by said iteration counter is equal to a value in said number of iterations register.

46. The method according to claim 40, wherein if said instruction sequencer with a next lower sequence iteration count is not issuing a last instruction in said next packet number of said instruction sequencer, said method further comprises repeating said step of determining if said sequence iteration count of said instruction sequencer is equal to a minimum sequence iteration count of said plurality of instruction sequencers.

* * * * *